United States Patent [19]
Meeker et al.

[11] Patent Number: 5,567,950
[45] Date of Patent: Oct. 22, 1996

[54] BISPECTRAL LANE MARKER

[75] Inventors: David L. Meeker; Kenneth G. Hall, both of Vicksburg, Miss.

[73] Assignee: The United States of America as represented by the Secretary of the Army, Washington, D.C.

[21] Appl. No.: 378,139

[22] Filed: Jan. 24, 1995

[51] Int. Cl.[6] .................................................. G01S 17/02
[52] U.S. Cl. ........................ 250/504 R; 250/495.1; 359/350
[58] Field of Search ...................... 250/504 R, 493.1, 250/495.1; 359/350

[56] References Cited

U.S. PATENT DOCUMENTS

| | | | |
|---|---|---|---|
| 2,872,675 | 2/1959 | Kennaugh | 342/7 |
| 3,039,093 | 6/1962 | Rockwood | 342/7 |
| 4,969,398 | 11/1990 | Lundwall | 102/293 |
| 5,159,489 | 10/1992 | Massie et al. | 359/414 |
| 5,326,265 | 7/1994 | Pryou | 434/11 |

*Primary Examiner*—Jack I. Berman
*Assistant Examiner*—Kiet T. Nguyen
*Attorney, Agent, or Firm*—Luther A. Marsh

[57] ABSTRACT

A passive, rigid, durable and inexpensive lane marker device that allows for remote observations of visual and infrared electromagnetic (EM) signatures. The rugged and rigid construction of the device permits flexible deployment thereof, either by manual placement or by air drop thereof. The lane marker is particularly suitable for hostile military environments which in turn enhances the survivability of military equipment. The lane marker herein is a bispectral lane marker (BLM) that functions as a "thermal mirror" such that thermal EM radiation is reflected in the direction of an approaching moving object such as a plane or land vehicle that are equipped with a thermal imaging system (TIS). The device is a rigid dihedral structure that reflects ambient radiant conditions for intended observation by a TIS.

6 Claims, 3 Drawing Sheets

INCIDENT FROM
FOREGROUND/SKY

0% REFLECTED
100% ABSORBED

100% EMISSION

+

TIS SEES TOTAL EMITTED

=

PROPERTIES OF BLACK-BODY REFLECTION AND EMISSION

INCIDENT FROM
FOREGROUND/SKY

PART ABSORBED
PART REFLECTED

PART EMISSION

+

TIS SEES SUM OF EMITTED AND REFLECTED

=

$a$ = ANGLE OF INCIDENT/ ANGLE OF REFLECTION

BISPECTRAL LANE MARKER

STATEMENT OF GOVERNMENT INTEREST

The invention described herein may be manufactured and used by or for the Government of the United States of America for governmental purposes without the payment of any royalties thereon.

FIELD OF THE INVENTION

This invention pertains to a terrestrial lane marker that allows for bispectral detection by possessing an observable signature in the thermal infrared and visible portions of the electromagnetic (EM) spectrum.

BACKGROUND OF THE INVENTION

Conventional lane markers are either active or passive devices used for indicating safe demarcation areas for either military or commercial activities. The passive markers are typically visual cue devices that are manually placed. They include flags or other artificial visual land monuments. Another type of marker is an active device that operates with an auxiliary power source that is used for activation of a visual marker. These include hooded night lights and exotic catapult launched fuel air explosive weapon system with deploying lane marker, e.g. see U.S. Pat. No. 4,969,398. Problems associated with these earlier lane marker devices when considering a military application include: i) their reliance only visual indication of a demarcated area which can readily be observed by hostile forces; ii) their lack of durability and portability; iii) their reliance on an auxiliary power source; and iv) their limited operational capability due to the necessary fact that they function only under day-lit conditions for the observation thereof.

U.S. Pat. No. 5,326,265 by Prevou entitled "Battlefield Reference Marking System Signal Device" teaches of a flexible tarp with grommet construction that includes an infrared reflective marking on the tarp. Limitations of the Prevou device include: i) a lack of rigidity which bears upon reliable operation thereof under adverse combat conditions where a tarp-like signal device can easily fail due to high winds or explosive battlefield conditions; ii) manual positioning is the only way for placement of this device by affixing the tarp to a supporting structure which may be impossible in a mined area; and iii) this device is intended for soldier transport in a folded packed condition which does not allow for a rigid condition as required by the instant invention for accurate and reliable observations thereof. This last instance has significant bearing upon reliable detections by a thermal imaging system (TIS).

The present invention herein solves these problems by providing a durable, rigid and simple lane marking device that allows for day and night operations in hostile environments.

SUMMARY OF THE INVENTION

The present invention describes a passive, rigid, durable and inexpensive lane marker device that allows for remote observations of visual and infrared electromagnetic (EM) signatures. The rugged and rigid construction of the device permits flexible deployment thereof, either by manual placement or by air drop thereof. The lane marker is particularly suitable for hostile military environments which in turn enhances the survivability of military equipment. The lane marker herein is a bispectral lane marker (BLM) that functions as a "thermal mirror" such that thermal EM radiation is reflected in the direction of an approaching moving object such as a plane or land vehicle that are equipped with a TIS. The device in a preferred embodiment is a rigid dihedral structure that reflects ambient radiant conditions for intended observation by a TIS. Alternative forms of the marker include a paraboloid or a conical device that allows for directional reflectivity. Additionally, the BLM can be a multiple built-up assembly with various patterns and distinguishing markings for required encoded information.

OBJECTS OF THE INVENTION

Accordingly, several objects and advantages of the present invention are:
(a) To provide a rigid and durable passive lane marker for military applications that relies on both visual and infrared EM signature aspects that prevents detection by hostile forces at night.
(b) To provide a passive lane marker that is durable and does not require a power source for its operation.
(c) To provide a lane marker that functions in both daytime and night conditions.
(d) To provide a lane marker that is of a unitary construction that allows for inexpensive fabrication and flexible deployment thereof.

Still further advantages will become apparent from consideration of the ensuing detailed description.

DETAILED DESCRIPTION

Figure 1A:
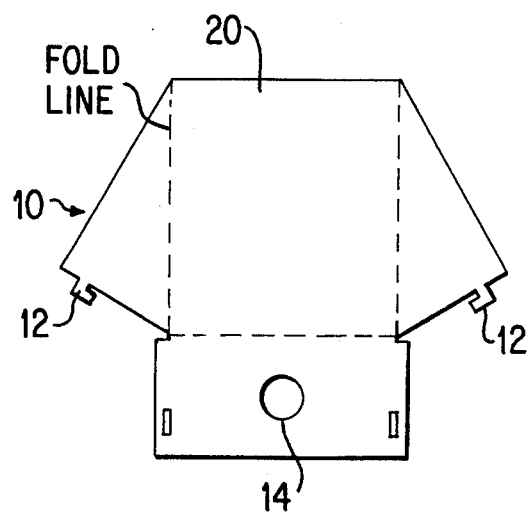
FIG. 1a shows a bispectral lane marker of unitary construction in a preferred flattened cutout form prior to fabrication.
Figure 1B:
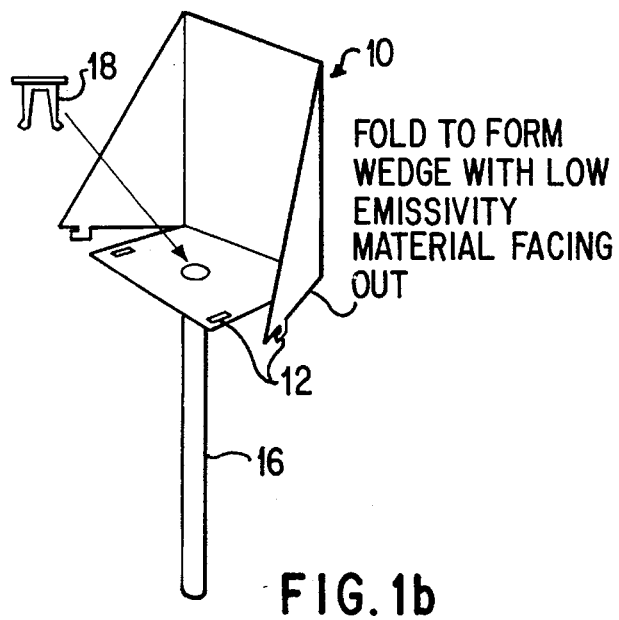
FIG. 1b shows a bispectral lane marker on a post with a snap on cap for fastening the marker to a pylon.
Figure 1C:
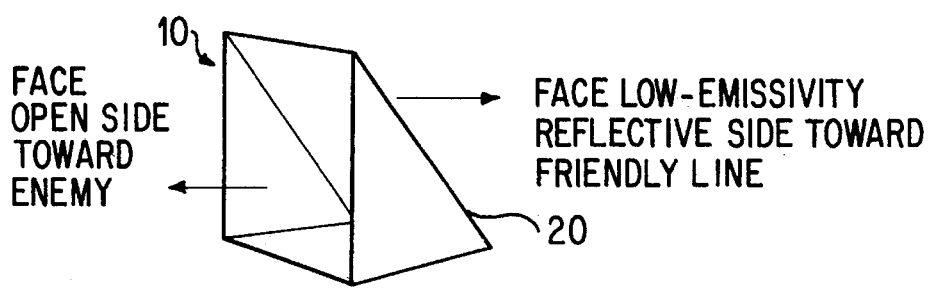
FIG. 1c shows a bispectral lane marker with a preferred orientation for military applications.

Optical properties of a lane marker that significantly enhance its' utility include using directional reflectance properties of thermal infrared EM radiation. The lane marker can include material itself which acts as a "thermal mirror" such that thermal energy may be reflected in the direction of an approaching moving object such as a jet or land vehicle that is equipped with a thermal imaging system (TIS). The device herein is termed a bispectral lane marker (BLM), which is shown in FIG. 1a, FIG. 1b & FIG. 1c in its preferred unitary constructed dihedral shape. The BLM 10 is a composite construction panel that forms a dihedral configuration when bent into the wedge form with locking tabs 12 with an optional hole 14 such that a supporting pole 16 with a snap on cap 18 for a fastening means when support is required for a the BLM 10. The dihedral angular form allows for reflection of cold sky emissions toward various approach angles. The internal angle of the BLM is preferably in a 20°–30° range. The BLM 10 includes a surface-applied material such as applique 20 with a Low-emissivity surface coating.

Materials used in the BLM 10 construction include a variety of plastics, polymers, metals or composite substrates. The applique 20 is constructed from a cross-linked polyethylene with ink added to the polyethylene for visual coloration along with a metal foil laminate that allows for reflection of ambient thermal radiation. Other polymers can be used as an overlay on the metal foil such as polyolefin, polypropylene, acrylonitrile-butadienestyrene. The metal foil materials used can be copper, aluminum, silver or gold. The substrate material on which the applique materials 20 are applied are any rigid materials that are man-made or natural, e.g. metals, plastic, wood or composites.

In order to understand how the bispectral capability can enhance the effectiveness of lane markers in general, a discussion of the physical laws governing is operation is provided.

Figure 2:
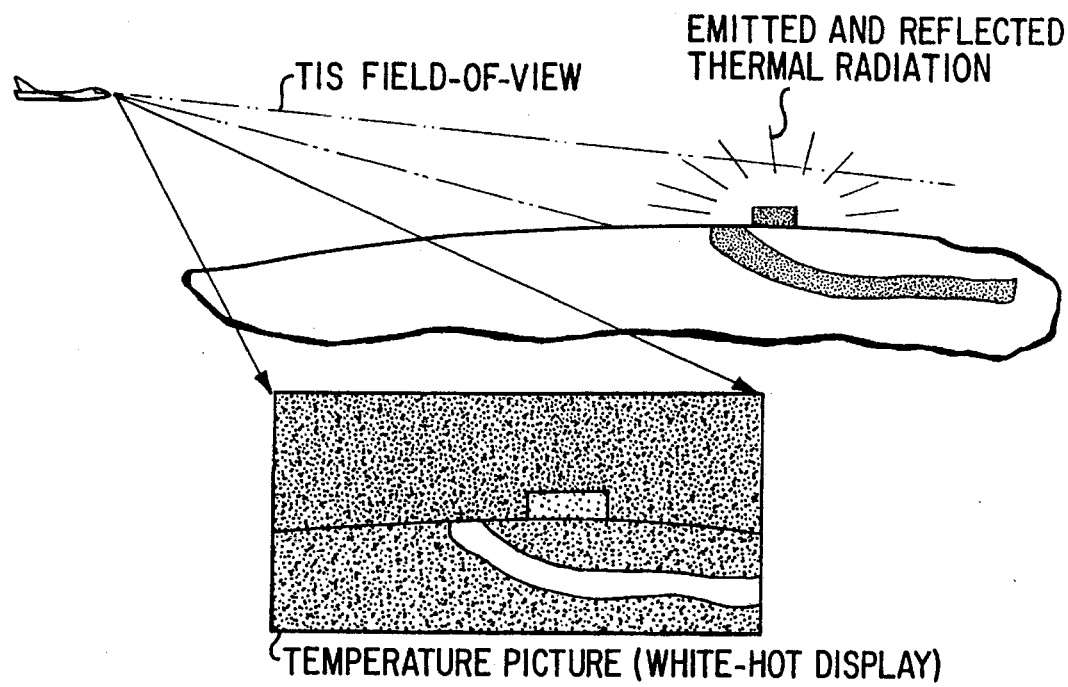
FIG. 2 shows how observation can be made by a thermal indicating system (TIS) for night observations of the marker.

Thermal imaging systems that are used in ground and air combat vehicle equipment operate by making a picture of the temperature of the objects in their field-of view as shown in FIG. 2. Lower temperature objects are generally represented by dark areas and higher temperatures by white areas which is analogous to a black-and-white television picture. The manner in which the objects' temperatures are determined obviously does not involve physical contact with the objects, as with a conventional thermometer. Conventional thermometers measure the temperature of objects by reaching thermal equilibrium with the object by transferring mechanical energy through physical contact. TIS's and other non-contact infrared thermometers, on the other hand, measure object temperatures by analysis of the EM energy, or light, radiated from an object in a specific wavelength interval. The term "light" is usually applied to electromagnetic energy visible to the human eye while that used by TIS's is usually the thermal infrared.

Figure 3:
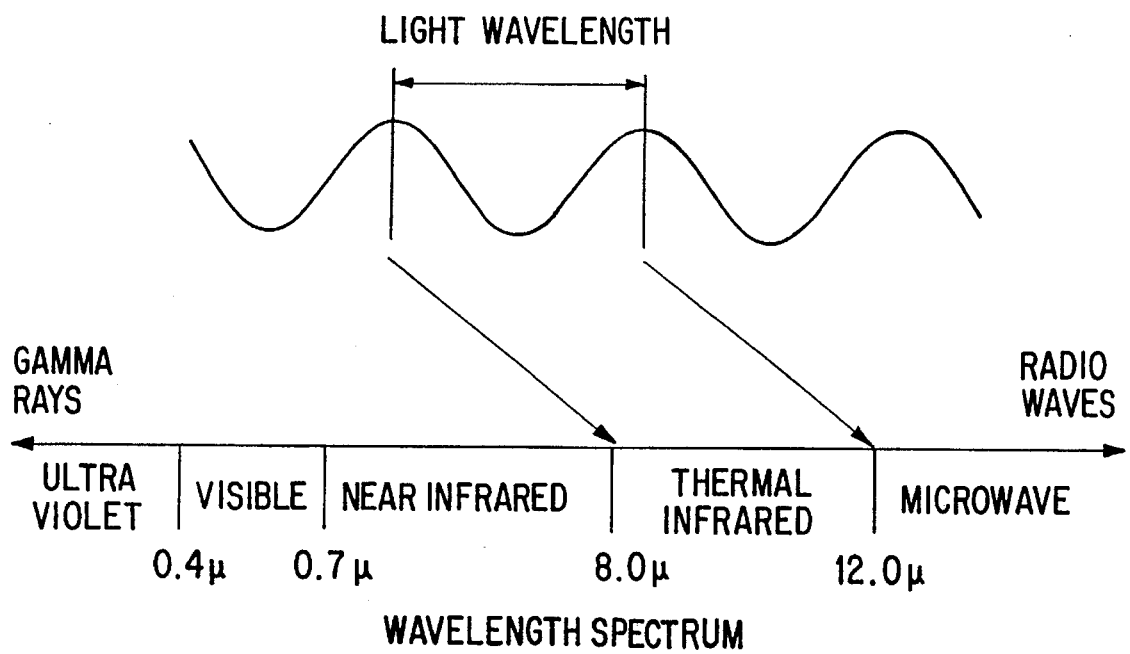
FIG. 3 shows the spectrum of electromagnetic radiation in which the bispectral lane marker is used which includes the visible and thermal infrared portion thereof.

The wavelength of an EM wave is the characteristic length of a complete cycle of the wave going from a crest through a trough back to a crest, as shown in FIG. 3. Electromagnetic wavelengths range in length from kilometers for radio waves through centimeters for microwaves down to nanometers and less for x-rays and gamma-rays. This extremely wide range of wavelengths is referred to as the spectrum as shown in FIG. 3. Waves visible to the human eye range from violet to red at about 0.4 through 0.7 microns. The wavelength interval used by infrared thermometers is in the 8–12 micron band of the spectrum. This is a good wavelength band because most objects of normal terrestrial temperatures radiate the largest portion of their energy here, and because atmospheric absorption of the electromagnetic energy is low relative to other regions of the spectrum. Since this "light" is perceived by humans as heat, energy emitted in this portion of the spectrum is referred to as thermal infrared radiation.

Figure 4:
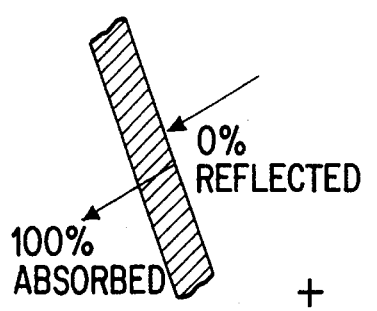
FIG. 4 shows differences in black body and gray body behavior in which the present invention uses bispectral characteristics.
Figure 4:
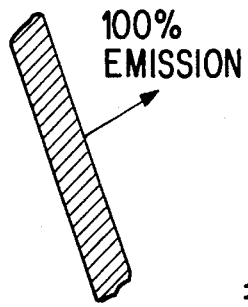
Figure 4:
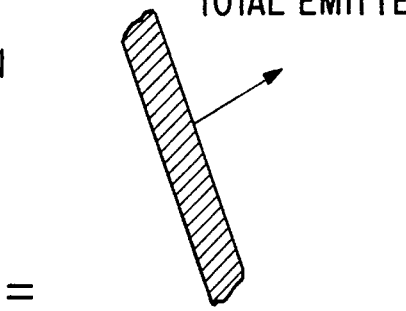
Figure 4:
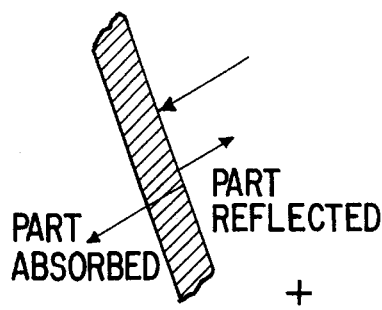
Figure 4:
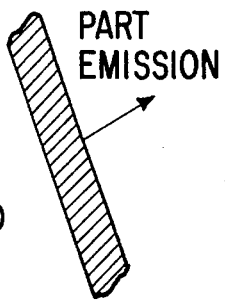
Figure 4:
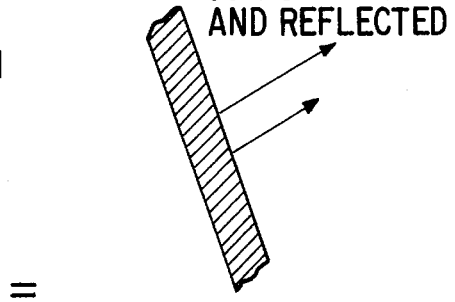

All objects emit, or radiate at all wavelengths, with the intensity at each wavelength determined by an object's temperature. Hotter objects emit more energy at higher wavelengths relative to cooler objects. The amount of electromagnetic energy emitted by an object at a given temperature can be calculated using a physical law called Planck's equation. This equation relates the temperature of an object to the amount of energy emitted by that object at different wavelengths. Planck's equation shows that all objects emit some energy at all wavelengths but that in general, most energy is confined to a band of wavelengths dependent on the objects' temperature. Planck's equation is valid for objects termed black bodies. These objects are so termed because they absorb all EM energy incident on their surface and appear black because no energy is reflected. Another property of black body objects is that they radiate 100 percent of the energy that is possible given their temperature. No objects are, in reality, black bodies. All objects emit something less than the amount of electromagnetic energy predicted by Planck's equation. They are termed gray bodies. The degree of "grayhess" of an object is expressed as an efficiency of emission, called the emissivity. This value ranges from 0.0 to 1.0, i.e. 0 to 100 percent emission, with 1.0 being the emissivity of a theoretical black body. FIG. 4 shows the basic differences between black body and gray-body behaviors and how this affects the radiation sent into a TIS's field of view.

An object emissivity is then used with the black-body results from Planck's equation to determine the actual amount of EM energy radiated by a real, gray-body object. Since all real objects are gray bodies, non-contact thermometers, such as a TIS, will not be able to absolutely determine the temperatures of objects in their field of view unless the object emissivities are known and can be factored into the equation. This is not the case in a real operational environment. Another consequence of gray-body objects is that, unlike black bodies, gray bodies do reflect a portion of the EM energy incident on their surface. In turn, the energy reaching a TIS is a combination of that due to an object's particular temperature and reflected energy that originated from that object's surroundings. Normally, no problems ensue since most objects have fairly high emissive efficiencies and low reflectance in the 8–12 micron band. Also, an operator of a TIS in most cases does not care about an object's actual temperature so long as the picture produced by the TIS is useful for effecting operational maneuvers. This mixing of emitted and reflected radiation is the conceptual basis of the BLM 10.

The bispectral material used in the BLM 10 has a very low emissive efficiency in the 8–12 micron band, i.e. less than 10%. Since reflectance is (1.0- emissivity) as derived from Kirchoff's law, a BLM would be highly reflective. Thus, the total amount of EM radiation leaving a surface of a BLM 10 material is up to 90 percent reflected from its surroundings, with the remainder being the BLM's own gray-body radiation. The BLM can use this low-emissivity property to appear much cooler to the TIS of a tactical air or terrestrial vehicle. Since the TIS computes temperature based on radiated energy, a reduction in emitted energy makes the object appear to be cooler even though the physical temperature may not change. In turn, the BLM uses this high reflectance property to regulate the amount of 8–12 micron energy sent to an approaching TIS. By setting the angle of the substrate construction so that the bispectral tape faces up, the BLM can send cold temperature EM radiation originating from the sky to the TIS. This creates a "black cold" spot in the thermal image.

Figure 5:
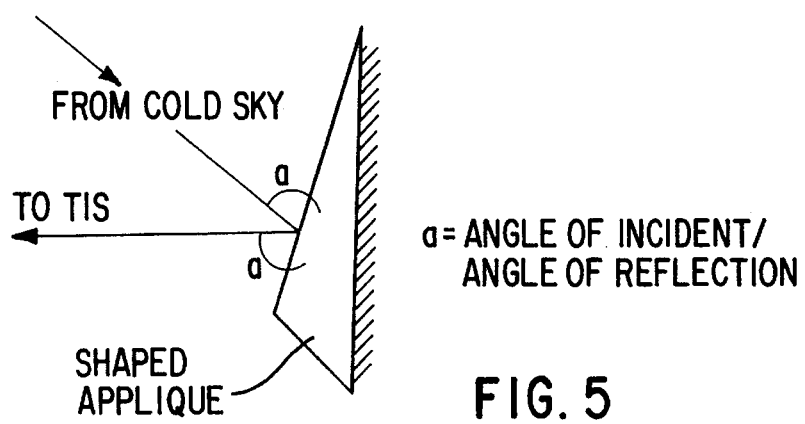
FIG. 5 shows Snell's law for explanation of the instant inventions operation.

Using the physical laws governing EM energy reflection in the visible and the infrared for the signature contrast enhancement capability of a lane marker, the use of comparable wedge type surface similar to the BLM's construction as discussed above. In FIG. 5, a shaped applique 20 surface is shown that reflects radiation incident thereto in essentially two ways, by i) specular and ii) diffuse reflections. Diffuse reflection means that a surface reflects a portion of incident radiation into all directions, regardless of the direction of origin. Specular reflection means that the radiation is reflected into a specific direction opposite from the incoming direction. The direction of specular reflection is determined by Snell's Law, which states that radiation is reflected at an angle to the surface equal to the angle of the incident radiation to the surface. FIG. 5 also illustrates Snell's Law and how this phenomenon is used to tune a BLM appearance to match the target foreground or sky signature. Most natural objects are diffuse reflectors with respect to the 8–12 micron wavelength band. Metal surfaces are an exception, as is the BLM bispectral material which are highly specular reflectors. using Snell's Law, a TIS can operate effectively in a predetermined direction as established by a properly oriented BLM 10. In operation, the BLM 10 reflects cold radiation from the sky which can be redirected to an approaching TIS, thus increasing the signature by elevating an apparent temperature contrast. This results in a "black hole" relative to the warmer background seen from the point of view of the approaching TIS. The BLM 10 can be manually placed for demarcation of designated areas or be attached to an appropriate ballast and support device for air drop into areas with undetonated munitions for safety of military personnel.

Variations of the preferred design include alternative bispectral materials. They include low-emissivity paints that have similar thermal and visual properties as the applique material 20 as discussed above. Such paints could be applied to the BLM panels to achieve results similar to the bispectral applique 20 material. However, the bispectral applique 20 material is preferred to low-emissivity paints since it has greater durability. Another variation includes the shape of the dihedral reflective planar BLM 10 surface which can be a different cut-out shape of a star or circle for conveying encoded information concerning a demarcated area. The BLM 10 can be used in many non-military applications as well. For example, thermal surveys of electrical power transmission lines and poles can use this device for location and detection of malfunctioning insulators or transformers during night observations by using the marker to designate a particular tower or pole. The BLM 10 can also be encoded with varied shaped applique materials 20 using either letters or numbers, thus enabling an efficient detection scheme for night-time observations. Yet another variation of the device's concavity form in view of its preferred dihedral form includes making it in either a hyperboloid or conical form for a directional reflectivity capability where a narrow observation corridor is desired. Additionally, the BLM 10 can be used in aeronautical or marine applications where night visual cues are required. The BLM 10 can also resemble a traffic sign with hidden thermal markings for law enforcement or border control activities.

Although the description above contains many specificities, these should not be construed as limiting the scope of this invention as set forth in the appended claims, but as merely providing illustration of the presently preferred embodiment of this invention.

We claim:

1. A bispectral lane marker used with a thermal imaging system that detects infrared electromagnetic (EM) radiation comprising:

a rigid multi-faced structure formed by at least one surface with concavity with means for rigidly maintaining the at least one surface with concavity and a means for supporting the lane marker;

the rigid multi-faced structure includes a bispectral differentiating means disposed on an exposed portion of the at least one surface with concavity for enabling infrared EM detection of the marker by the thermal imaging system.

2. The bispectral lane marker of claim 1 wherein: the at least one surface with concavity is a single dihedral surface; the means for rigidly maintaining the single dihedral surface is two side plane surfaces; a bottom of the lane marker is one of the surfaces of the dihedral surface which includes a hole, the hole allows for a pylon which is the means for supporting the lane marker; and the bispectral differentiating means is an applique composite material with a low emissivity material.

3. The bispectral lane marker of claim 2 wherein the single dihedral surface forms an interior angle in the range of 20°–30°.

4. The bispectral lane marker of claim 2 wherein the applique composite material with the low emissivity material is a cross-linked polyethylene with ink added to the cross-linked polyethylene for visual coloration along with a metal foil laminate that allows for reflection of ambient thermal radiation.

5. The bispectral lane marker of claim 4 wherein polymers that overlay the metal foil laminate are selected from the group consisting of polyolefin, polyethylene, polypropylene, and acrylonitrile-butadiene-styrene.

6. The bispectral lane marker of claim 2 wherein the applique composite material with the low emissivity material is a low-emissivity paint.

\* \* \* \* \*